United States Patent [19]
Bock et al.

[11] Patent Number: 5,383,680
[45] Date of Patent: Jan. 24, 1995

[54] ANTI-ROLL SYSTEM FOR WHEELED VEHICLES

[75] Inventors: Peter D. Bock, Dearborn; Glenn R. O'Rourke, Chesterfield, both of Mich.

[73] Assignee: Cadillac Gage Textron Inc., Warren, Mich.

[21] Appl. No.: 993,427

[22] Filed: Dec. 21, 1992

[51] Int. Cl.$^6$ ............................................. B60G 11/26
[52] U.S. Cl. ................... 280/714; 280/6.12; 280/689; 280/707; 280/772
[58] Field of Search ............ 280/707, 689, 714, 6.12, 280/772; 364/424.05; 180/282

[56] References Cited

U.S. PATENT DOCUMENTS

| | | | |
|---|---|---|---|
| 3,917,295 | 11/1975 | Hiruma | 280/6 |
| 3,938,823 | 2/1976 | Hiruma | |
| 4,267,736 | 5/1981 | Westbeck | 74/5.22 |
| 4,386,674 | 6/1983 | Sugata | 180/282 |
| 4,865,347 | 9/1989 | Fukushima et al. | 280/707 |
| 4,913,457 | 4/1990 | Hafner et al. | 280/707 |
| 4,973,077 | 11/1990 | Kuwayama et al. | 280/689 |
| 4,993,744 | 2/1991 | Hiromoto et al. | 280/707 |
| 5,087,073 | 2/1992 | Lund | 280/772 |

FOREIGN PATENT DOCUMENTS

| | | | |
|---|---|---|---|
| 62-6817 | 1/1987 | Japan | 280/707 |
| 4191179 | 7/1992 | Japan | 180/282 |
| 4191180 | 7/1992 | Japan | 180/282 |
| 4191181 | 7/1992 | Japan | 180/282 |

Primary Examiner—Eric D. Culbreth
Attorney, Agent, or Firm—Reising, Ethington, Barnard, Perry & Milton

[57] ABSTRACT

An anti-roll system for wheeled vehicles has one selective, unidirectionally lockable device per each independent suspension assembly having telescoping members connected between the sprung and unsprung masses that are free to extend or contract during vehicle operation which results in minimal lateral acceleration of the vehicle's sprung mass as when traveling down a straight roadway. The telescoping members include a piston that partially defines first and second chambers interconnected through valves to one another and to a common reservoir. The valves are activated, by a control system signal, when the sprung mass is subjected to a lateral acceleration which exceeds a preset threshold as when rounding a curve, blocking flow from one or the other of the first or second chambers so as to lock the outboard device, with respect to the curve, only against contraction and to lock the inboard device only against extension. The devices, in the locked-out condition, impart a high roll stiffness to reduce the tilt angle of the vehicle for a given maneuver and increase the vehicle's roll-over threshold. The devices, while in a locked mode of operation, are allowed to react, when signaled, to high frequency road disturbances by opening a fast acting valve, momentarily unlocking the device so as to not affect ride quality, when the wheel of a respective independent suspension assembly is subjected to a vertical force which exceeds a preset threshold. The fast acting valve is again closed once the road disturbance has passed re-locking the device in the appropriate direction.

10 Claims, 7 Drawing Sheets

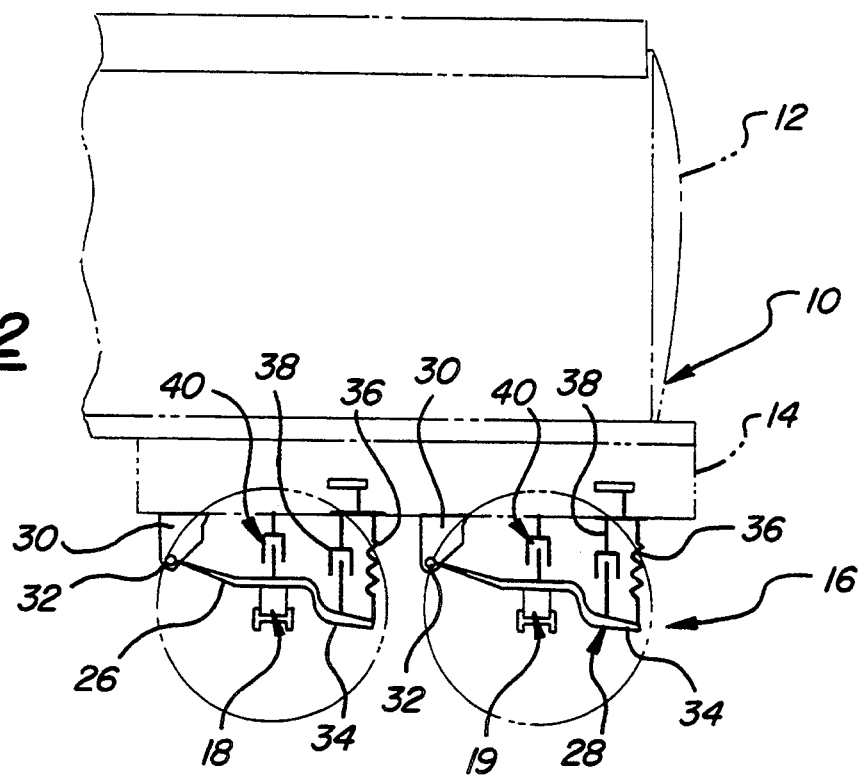
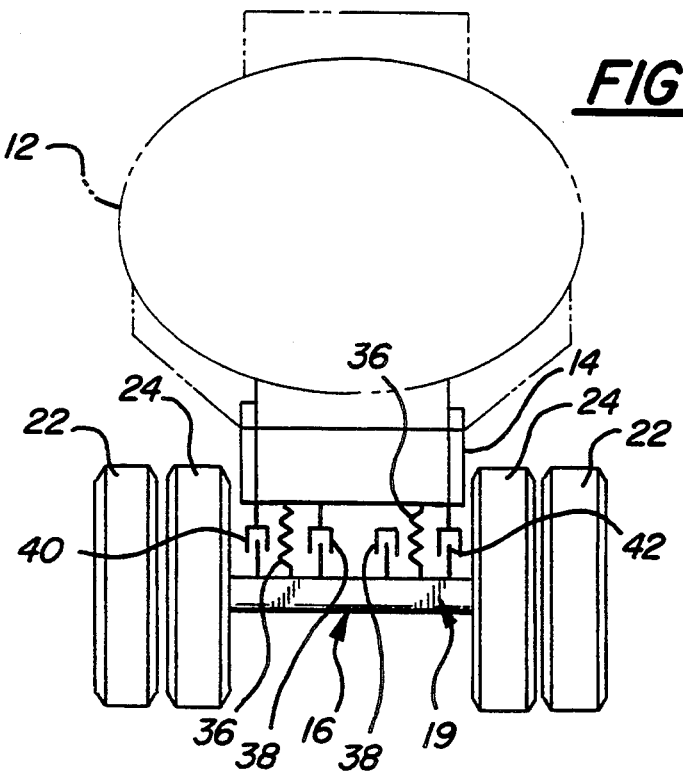

ANTI-ROLL SYSTEM FOR WHEELED VEHICLES

FIELD OF THE INVENTION

This invention relates to anti-roll systems for wheeled vehicles and more particularly to anti-roll systems that increase the roll stiffness and corresponding roll-over threshold of vehicles, either self-propelled or towed, during dynamic maneuvers.

DESCRIPTION OF RELATED ART

Roll-over of a non-compliant vehicle is governed by the equation:

$$a = t/(2 \times h)$$

where:
 a=the roll-over threshold (g's)
 t=the sprung mass center of gravity (in.)
 h=the track width of the vehicle (inches)
Any compliances associated with the tires, suspension, chassis, and payload act to reduce this threshold. Therefore, the roll-over threshold of a particular vehicle occurs at a lateral acceleration level equal to the roll-over threshold (a) minus the compliant factors.

Particular classes of wheeled vehicles, especially tractor semi-trailer combinations are characterized as having high center of gravities, and thus relatively low roll-over thresholds. These vehicles may be exposed to lateral acceleration levels during conceivable vehicle operating scenarios which exceed their respective roll-over threshold, resulting in vehicle roll-over. For example, such scenarios include when the vehicle is driven through a tight curve at elevated speed or during high speed obstacle avoidance type maneuvers. The operational safety of these vehicles can be improved by increasing their respective roll stiffness and corresponding roll-over threshold.

One approach to increasing the roll stiffness of such vehicles is to provide a mechanical device interconnecting the right and left suspension assemblies of the vehicle. Such devices increase the roll stiffness of the vehicle's suspension system which in turn increases the roll-over threshold of the vehicle. An example is a structural member mounted on the center line of the axle coupling right and left independent suspensions. If the wheels of both of the independent suspensions hit an obstacle at the same time there is no load transfer into the structural member and the resistance to jounce and rebound movement is that provided by the suspension springs and associated dampers. If, however, the wheels are moved in opposite directions, a case that occurs when the vehicle suspension system deflects non-uniformly as the sprung mass is subjected to a lateral acceleration, the structural member is subjected to an imbalanced load that will cause it to elastically deform so as to increase the roll stiffness of the suspension system. An example of this type of system is set forth in U.S. Pat. No. 4,637,628.

Another class of anti-roll devices are energy additive devices that include components that can be pressurized or depressurized to modify the suspension system by the addition or subtraction of energy at select points therein so as to stabilize the vehicle chassis or trailer body. Such energy adding devices are also referred to as active suspension systems. They are responsive to vehicle operation or terrain conditions to produce desired stabilization. One example of such a system is an active suspension system that includes an on-board hydraulic pump and reservoir system such as disclosed in U.S. Pat. No. 3,038,739 issued Jun. 12, 1962 to Vogel. Servo valves regulate the flow between a pump, reservoir and hydraulic actuators that produce changes in the vehicle suspension that will resist the tendency of the vehicle chassis or trailer body to tip as it is subjected to lateral acceleration, by producing a force on the vehicle chassis that will resist such tipping motion. U.S. Pat. Nos. 5,087,073; 4,993,744 and 4,865,347 disclose vehicle suspension units that have the energy level therein changed to compensate for vehicle rolling forces by tilting the vehicle body in a direction to counteract such forces.

U.S. Pat. Nos. 3,917,295 and 3,938,823 disclose arrangements in which level adjustors in a vehicle suspension are fluidly locked when sensed vehicle roll exceeds a predetermined level. The level adjustors are locked in a given height position to prevent errors in vehicle leveling due to roll.

U.S. Pat. No. 4,267,736, issued May 19, 1981 discloses a tilting arrangement in which the vehicle body is tilted with respect to the vehicle frame to compensate for centrifugal force generated on subjects within the vehicle body.

U.S. Pat. No. 4,973,077, issued Nov. 27, 1990 discloses a mechanical roll stiffening stabilizer device that has a center spring portion that is selectively engaged or disengaged by an actuator for controlling the anti-roll characteristics of the stabilizer device.

While the aforedescribed arrangements are suitable for their intended purpose, the mechanical systems reduce the ride quality while counteracting vehicle rolling forces and the active systems require substantial plumbing and control interconnections that significantly add to the weight of a vehicle suspension and also adds significant cost and complexity in order to achieve both increases in roll stability and ride quality.

SUMMARY OF THE INVENTION AND ADVANTAGES

Accordingly, an object of the present invention is to provide a low cost, low weight, low power consumption system for improving the roll stability of wheeled vehicles, whether self-propelled or towed.

Another object of the present invention is to provide a system for improving the roll stability of a vehicle while minimizing the impact on the overall ride characteristics of the vehicle.

The anti-roll system of the present invention includes selective, unidirectionally lockable devices having telescoping members connected respectively between the sprung and unsprung masses of a vehicle at each independent suspension assembly. The devices are free to extend or contract relative to one another during vehicle operation which results in minimal lateral acceleration of the vehicle's sprung mass. The telescoping members include a piston within a cylinder that defines first and second chambers which are interconnected through valves to one another and to a common reservoir to form an assembly. These valves are activated, by a control system signal, when the sprung mass is subjected to a lateral acceleration which exceeds a preset threshold, blocking flow from one or the other of the first or second chambers so as to lock the outboard device against contraction while allowing it to extend and to lock the inboard device against extension while allowing it to contract. The devices in the locked-out condition impart a high roll stiffness into the vehicle's suspension system, thus reducing the tilt angle of the vehicle for a given maneuver and increasing the vehicle's roll-over threshold. The anti-roll system of the present invention further includes a control system having a device such as an accelerometer that detects vehicle conditions such as lateral acceleration and a controller to interpret sensed conditions and to command the individual valves located at each device assembly to selectively lock-out, dependent upon the conditions, individual selective, unidirectionally lockable devices.

FIG. 1 shows the approximate roll-over threshold improvement with respect to center of gravity height resulting from the addition of this invention onto a particular semi-trailer application. Curve 5 in FIG. 1 shows the roll-over thresholds for different height standard vehicles. Curve 6 shows the roll-over thresholds for different height vehicles including the present invention.

The base line characteristics of one representative trailer include:
 Center of gravity height of 60 inches above the roll center.
 Initial roll stiffness of 120,000 in.-lbs./deg.
 Roll center height of 24 inches above the ground.
 Vehicle track width of 71.5 inches.
 Sprung weight of 31,000 lbs.

The invention improves the roll-over threshold of the vehicle described above from 0.34 g's to 0.43 g's or a 26% improvement as shown at point A on curve 5 and point B on curve 6, respectively. The degree to which this invention can increase the roll-over threshold of any given vehicle/suspension configuration is dependent on the original characteristics of the base vehicle and suspension system.

Another advantage of the anti-roll system configuration of the present invention is that it allows for truly independent suspension assemblies. The typical mechanical anti-roll device which interconnects the right and left suspension assemblies can be eliminated, thus allowing further optimization of the suspension system and vehicle designs.

BRIEF DESCRIPTION OF THE DRAWING

These and other objects and advantages of the present invention will become more apparent from the following description taken in conjunction with the accompanying drawings wherein like reference numerals refer to like parts and wherein:

FIG. 2 is a diagrammatic side view of a vehicle suspension having an axle that couples the right and left independent suspension assemblies providing a mechanical anti-roll function that is associated with selective, unidirectionally lockable devices of the present invention;

FIG. 2A is a diagrammatic end view of the vehicle suspension including the present invention shown in FIG. 2. The springs and dampers of the suspension system and the selective, unidirectionally lockable devices are shown laterally out of position for clarity;

DETAILED DESCRIPTION OF A PREFERRED EMBODIMENT

Figure 1:
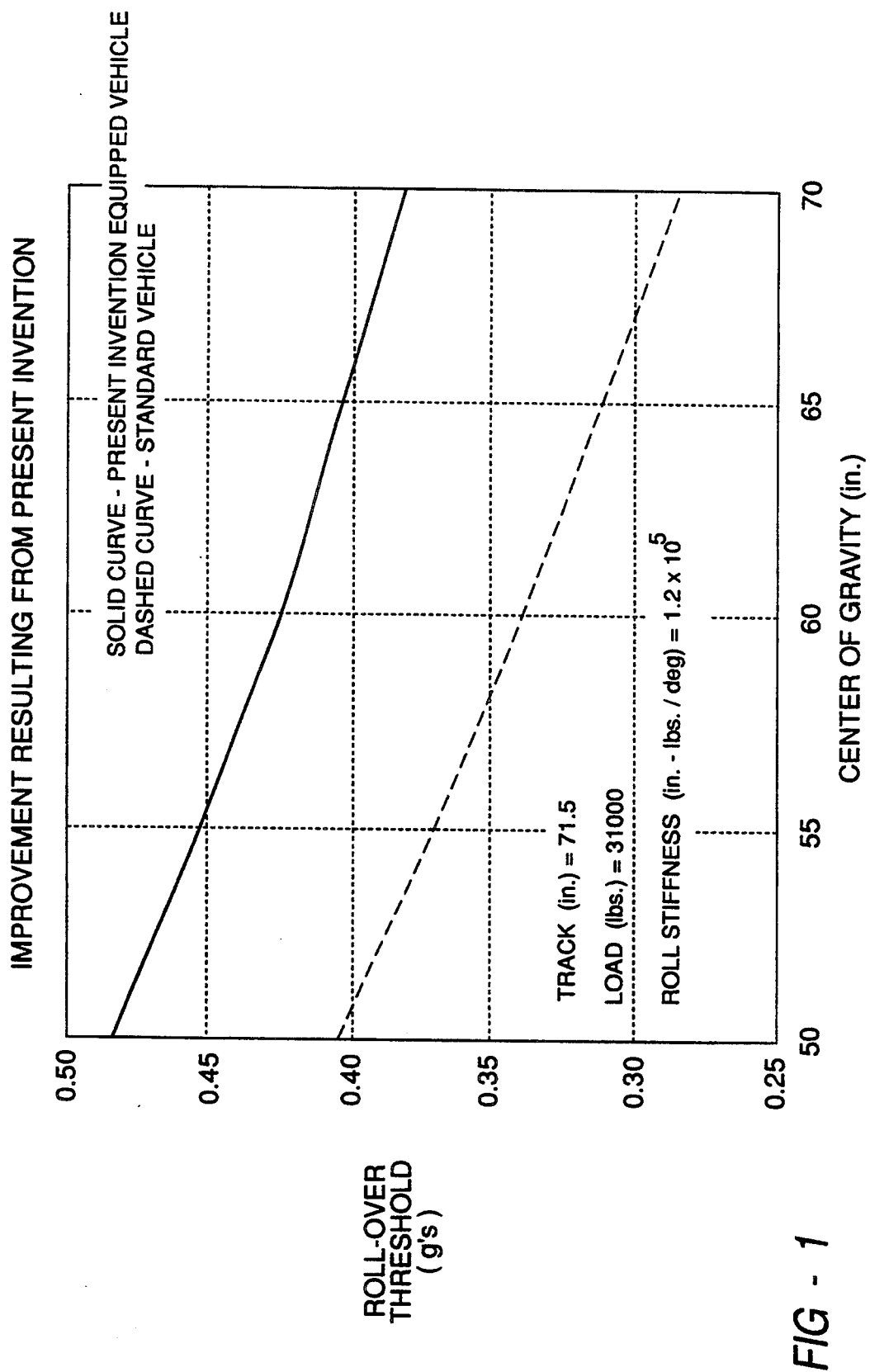
FIG. 1 is a graphical representation of the vehicle roll-over threshold improvements provided by incorporation of the present invention onto a specific semi-trailer application.
Figure 3:
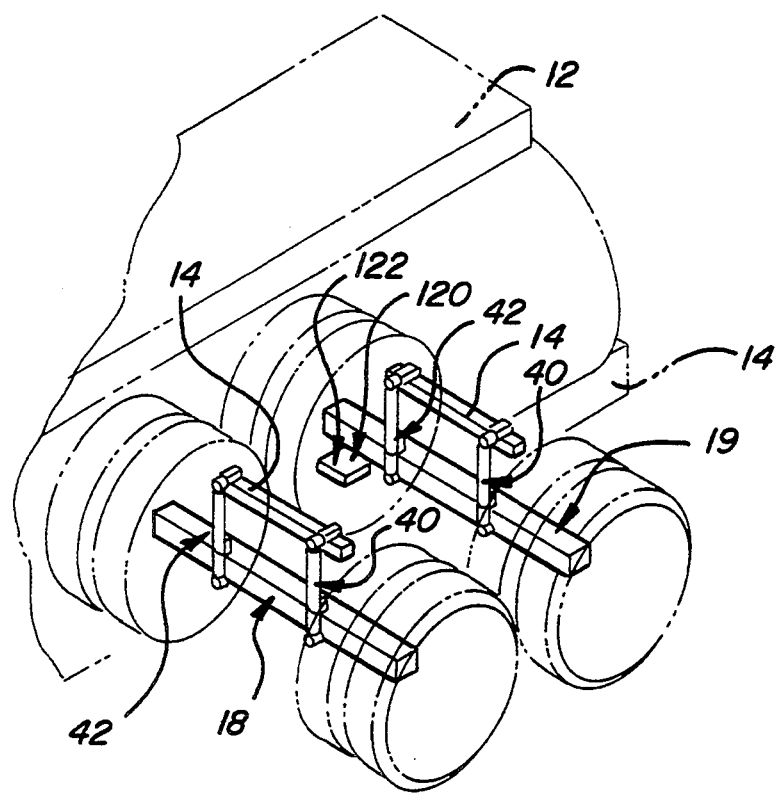
FIG. 3 is a perspective view of the vehicle suspension shown in FIGS. 2 and 2A with the selective, unidirectionally lockable devices of the present invention located at each wheel position. The controller and sensor assembly is shown mounted to the vehicle frame. The suspension springs and dampers are removed for clarity.
Figure 4:
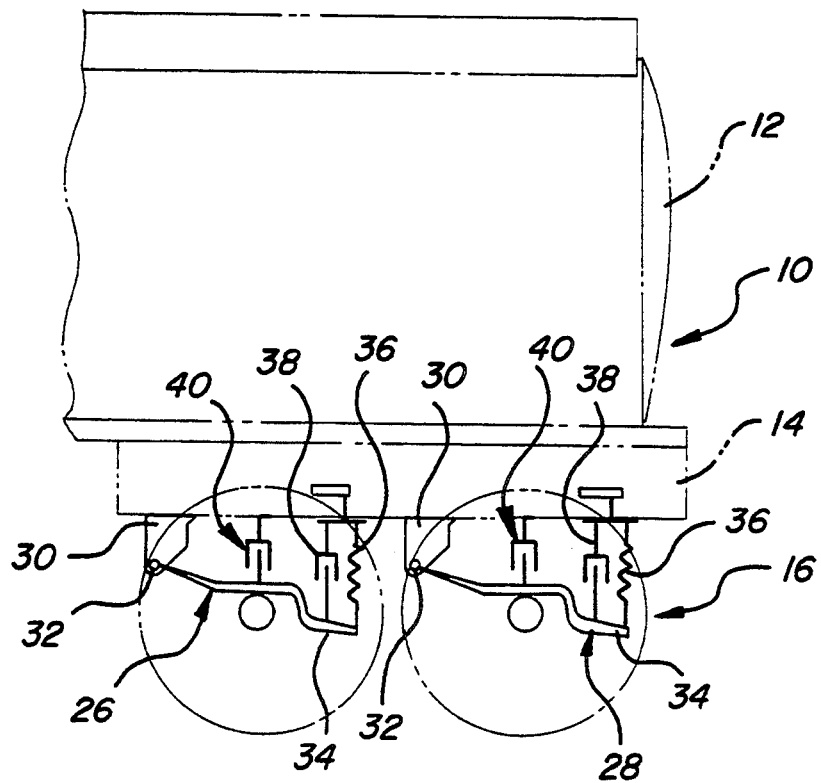
FIG. 4 is a diagrammatic side view of a vehicle suspension including the present invention. In this case the present invention solely provides the roll stiffness resulting in fully independent right and left suspension assemblies.
Figure 4A:
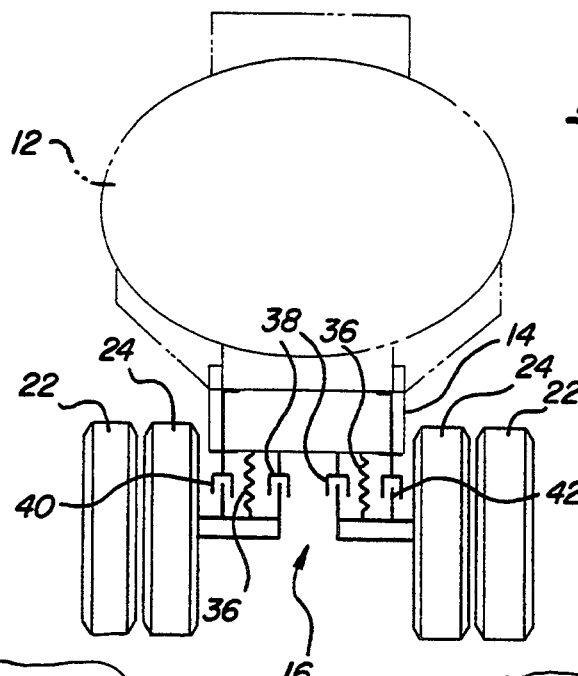
FIG. 4A is a diagrammatic end view of the vehicle suspension including the present invention shown in FIG. 4. The springs, dampers, and selective, unidirectionally lockable devices are shown laterally out of position for clarity.

Referring now to FIGS. 2 through 4, a wheeled vehicle 10 is illustrated that is representative of either a self-propelled vehicle or a towed vehicle that is subjected to a lateral acceleration when propelled or towed through a curve or evasive lane change. Such vehicles, especially tractor semi-trailer combinations have a tendency to roll-over when exposed to the lateral accelerations developed during such turning movements. The vehicle 10 in the illustrated arrangement includes a tank 12 mounted on a box frame 14. A rear suspension 16 supports the sprung mass represented by the tank 12 and frame 14. The rear suspension 16 includes double axles 18, 19 each supporting a pair of tandem wheels 22, 24 at opposite ends thereof. The axles 18, 19 also couple the right and left independent suspension assemblies providing a mechanical anti-roll device.

The trailing arms 26, 28 are connected to the axles 18, 19. Each of the trailing arms 26, 28 is connected to a bracket 30 on the frame 14 by a pivot pin 32. Each of the trailing arms 26, 28 has a distal end 34 that supports a suspension spring 36 for supporting the weight of the sprung mass. Each suspension spring 36 is associated with a damper 38 for damping vibrations caused by road induced disturbances.

While a trailer suspension with cross-axles is illustrated it should be understood that the present invention is suitable for use with other vehicle suspensions such as independent rear wheel suspensions and the like for either trailers or motor driven vehicles.

Figure 5:
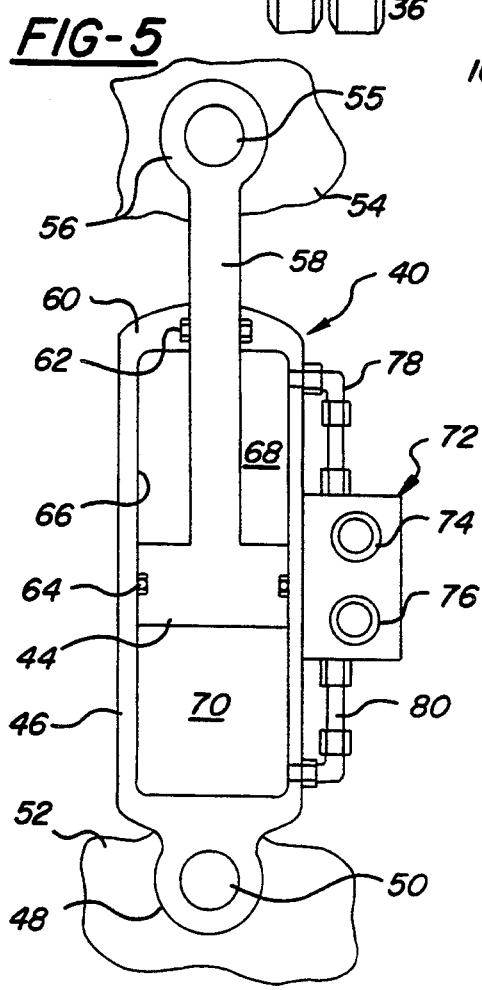
FIG. 5 is a sectional view of one embodiment of the selective, unidirectionally lockable device which utilizes a double acting hydraulic cylinder with remote reservoir and relief valve combined with a manifold assembly to provide the selective, unidirectionally locking capabilities.
Figure 5A:
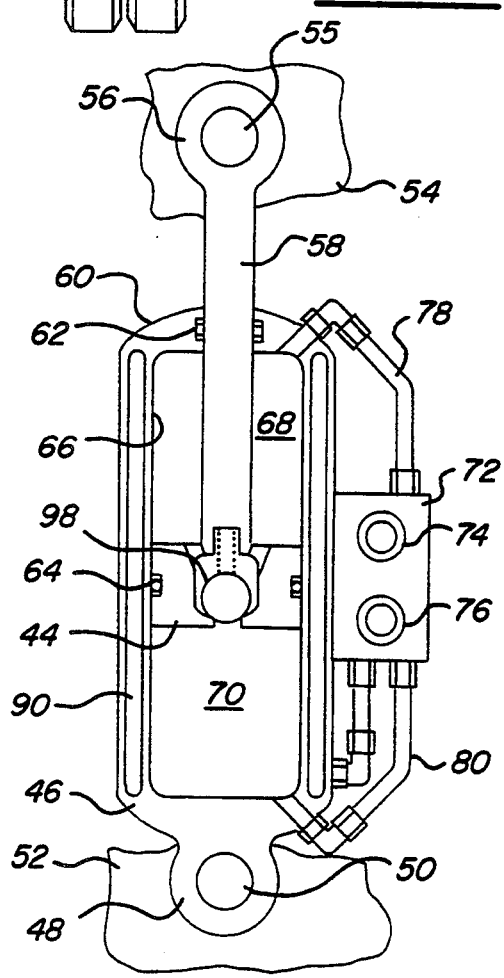
FIG. 5A is a sectional view of an alternate selective, unidirectionally lockable device which utilizes a double acting hydraulic cylinder with integral reservoir and relief valve combined with a manifold assembly to provide the selective, unidirectionally locking capabilities.

In accordance with the present invention the anti-roll system includes a pair of selective, unidirectionally lockable devices 40, 42 on each of the axles 18, 19 interconnecting the axles 18, 19 with the frame 14. As shown in FIGS. 5 and 5A, each of the devices 40, 42 includes a reciprocating piston 44 that is supported within a cylinder 46. The cylinder 46 has a mount 48 connected by a pin 50 to a trailing arm 26 or 28 at a bracket 52 that supports the mount 48 at a point below a frame 14 mounted upper bracket 54 that is connected by a pin 55 to a mount 56 on an outer end of a piston rod 58. The piston rod 58 has an inner end connected to the piston 44. The piston rod 58 extends through a cover 60 of the cylinder 46 where its outer periphery is sealed by an annular seal member 62 supported with respect to the cover 60. An annular seal member 64 is carried on the outer periphery of the piston 44 whereby the cylinder 46 is separated into first and second sealed chambers 68, 70.

Figure 6:
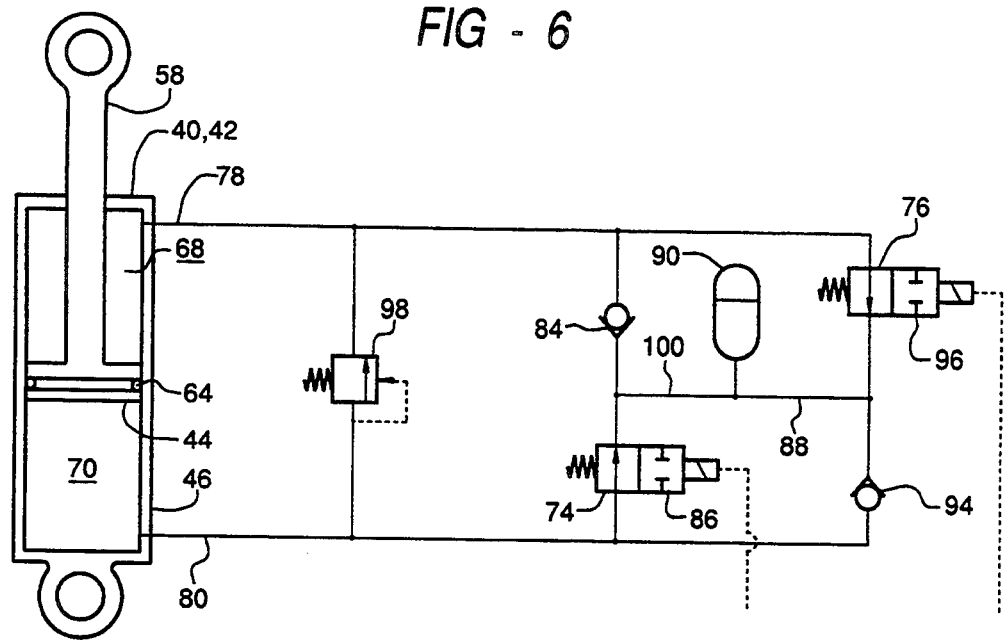
FIG. 6 is a diagrammatic view of the component parts of the hydraulic cylinder and manifold assembly shown in FIGS. 5 and 5A.
Figure 6A:
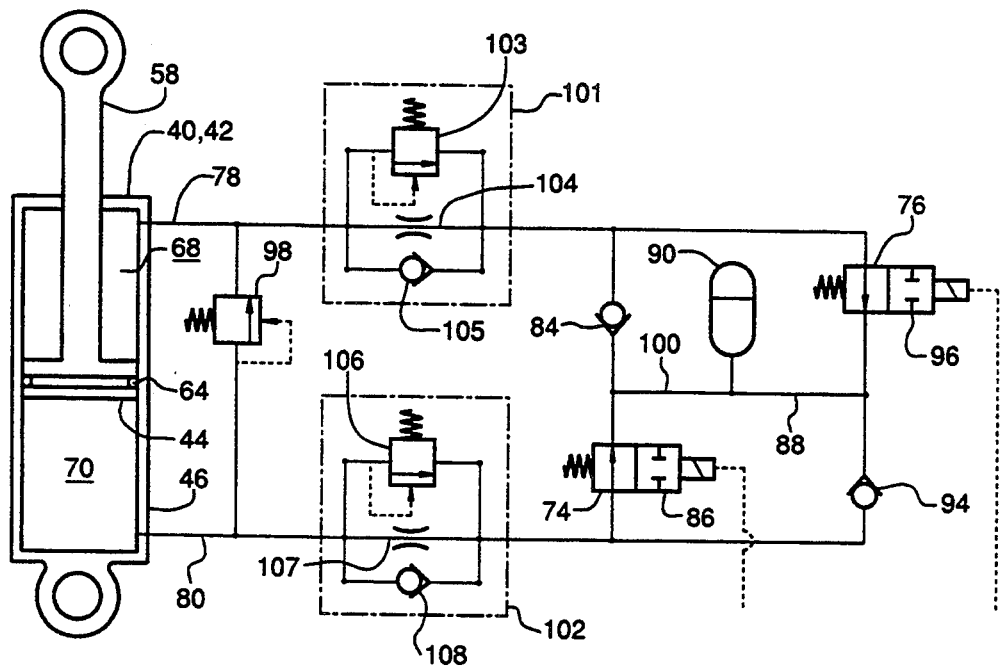
FIG. 6A is a diagrammatic view of the component parts of the hydraulic cylinder and manifold assembly shown in FIG. 5 and 5A with the addition of those components required to provide damping capabilities, thus providing selective, unidirectionally locking and damping capabilities in one device.

The upper chamber 68 is connected to a manifold assembly 72 by an upper tube 78 and the lower chamber 70 is connected to the manifold assembly 72 by a lower tube 80. The manifold assembly 72 regulates the transfer of fluid between the chambers 68, 70 and a common reservoir 90 that is shown in FIG. 6. Two configurations for internal porting of the manifold assembly 72 are illustrated in FIGS. 6 and 6A. The embodiment shown in FIG. 5A is like that in FIG. 5 but includes the common reservoir 90 as an integral part of the device 40, 42. Additionally, in the embodiment of FIG. 5A, a relief valve 98 is incorporated into the piston 44 for controlling fluid flow between the chamber 68, 70 in a manner to be described. The embodiment shown in FIG. 5 shows a device having an externally located reservoir 90 and relief valve 98 as will be described below.

In a free floating mode of operation, during jounce movement (contraction of rod 38 into the cylinder 46), fluid from lower chamber 70 is discharged through tube 80 into the manifold assembly 72. As shown in FIG. 6 discharge into the tube 80 is directed through normally open solenoid valve 74 and either through one way check valve 84 into tube 78 thence to upper chamber 68 or through hydraulic port 100 into reservoir 90 (differential oil volume due to displacement of piston rod 58 as it moves interiorly of the cylinder 46). During rebound movement (extension of the rod 38 from within the cylinder 46), fluid from chamber 68 is discharged through tube 78 into manifold assembly 72 where it is directed through normally open solenoid valve 76 and one way check valve 94 into tube 80 thence to lower chamber 70. Additionally, to compensate for the volume of the piston rod 58 displaced from upper chamber 68, fluid is drawn from reservoir 90 through hydraulic port 88 and one way check valve 94 into tube 80 thence to lower chamber 70. Such free floating mode of operation will enable the suspension system to operate without adversely affecting the ride quality provided by the spring and damper components thereof.

In the unidirectionally locked mode of operation, jounce direction (contraction), normally open solenoid valve 74 has its solenoid coil energized to position the valve 74 in its closed position shown at 86 trapping a volume of fluid within lower chamber 70, thus hydraulically locking the respective selective unidirectionally lockable device 40 or 42 in the jounce direction. The selective unidirectionally lockable device 40 or 42 however, is still capable of extending whereby fluid is discharged from upper chamber 68 through tube 78 into manifold assembly 72 where it is directed through normally open solenoid valve 76 and one way check valve 94 into tube 80 thence to lower chamber 70. As described above, fluid is also drawn from reservoir 90 through hydraulic port 88 and one way check valve 94 into tube 80 thence to lower chamber 70. For very rapid roadwheel motions (beyond the response time of normally open solenoid valve 74), high pressure fluid is directed from lower chamber 70 through tube 80 and relief valve 98 into tube 78 thence to upper chamber 68. Additionally, fluid volume equal to that displaced by piston rod 58 is directed through tube 78 and normally open solenoid valve 76 through hydraulic port 88 thence to reservoir 90.

In the unidirectionally locked mode of operation, rebound direction, (extension) normally open solenoid valve 76 has its solenoid coil energized to position the valve 76 in its closed position shown at 96 trapping a volume of fluid within upper chamber 68, thus hydraulically locking the respective selective unidirectionally lockable device 40 or 42 in the rebound direction. The selective unidirectionally lockable device 40 or 42, however is still capable of contracting whereby fluid is discharged from lower chamber 70 through tube 80 into manifold assembly 72 where it is directed either through normally open solenoid valve 74 and one way check valve 84 into tube 78 thence to upper chamber 68 or through hydraulic port 100 into reservoir 90.

FIG. 6A shows a second embodiment of selective unidirectionally lockable device 40, 42 whereby the selective, unidirectionally lockable device or anti-roll function is combined with the suspension system damper or shock absorber function, combining both functions into one device. Therefore, in the free floating mode of operation, where the damper function is required, and during jounce movement, fluid from lower chamber 70 is discharged through tube 80 into manifold assembly 72 where it is directed through the damper module 102 (orifice 107 or relief valve 106 dependent upon differential pressure across module 102) into normally open solenoid valve 74 and either through one way check valve 84 and damper module 101 (one way check valve 105) into tube 78 thence to upper chamber 68 or through hydraulic port 100 into reservoir 90. During rebound movement, fluid from chamber 68 is discharged through tube 78 into manifold assembly 72 where it is directed through damper module 101 (orifice 104 or relief valve 103 dependent upon differential pressure across module 101) through normally open solenoid valve 76 and one way check valve 94 into damper module 102 (one way check valve 108) through tube 80 thence to lower chamber 70. Additionally, to compensate for the fluid displaced by piston rod 58 in upper chamber 68, fluid is drawn from reservoir 90 through hydraulic port 88 and one way check valve 94 into damper module 102 (one way check valve 108) through tube 80 thence to lower chamber 70.

Figure 7:
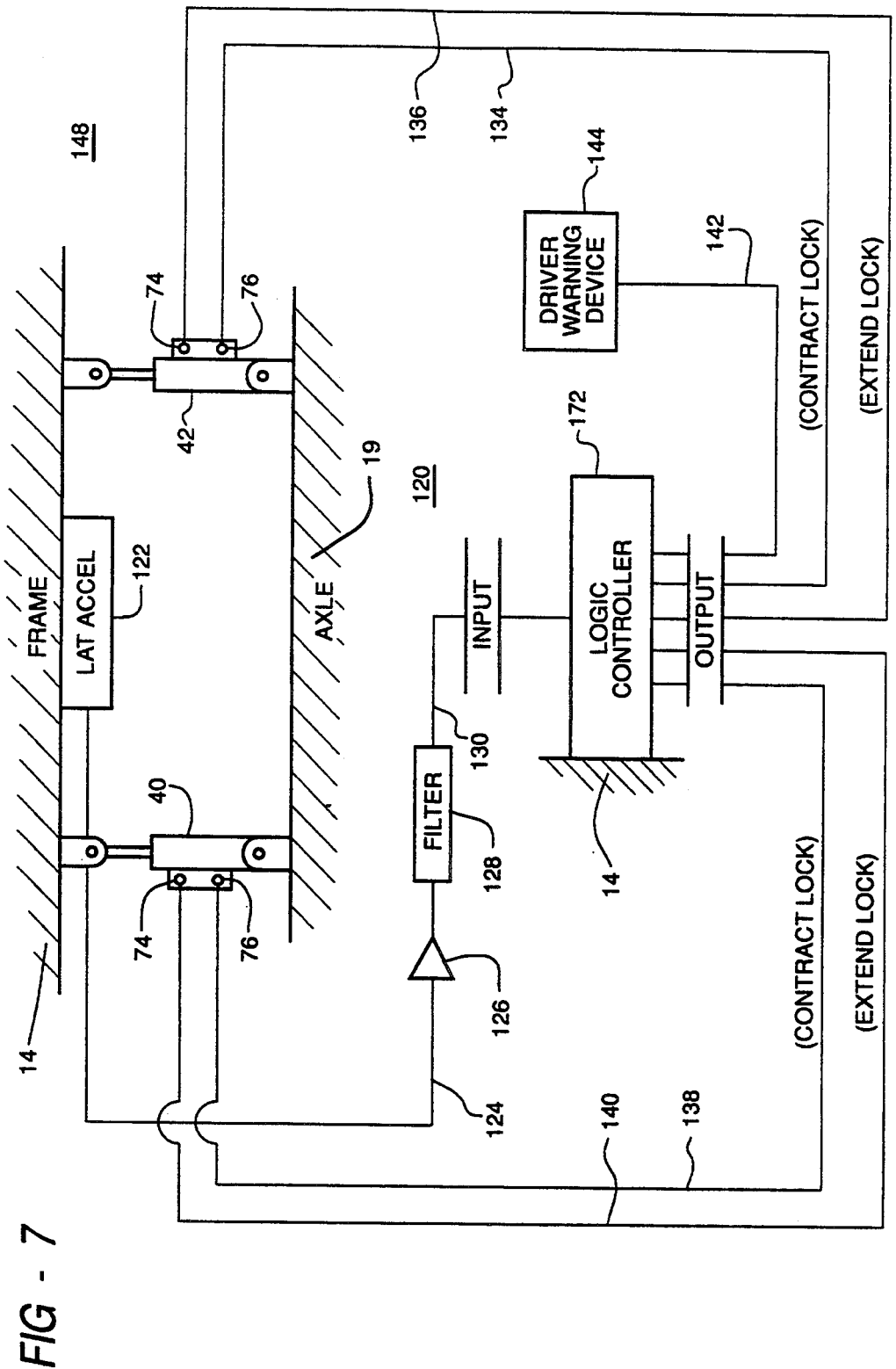
FIG. 7 is a schematic diagram showing the components that make up the anti-roll system of the present invention.

A control system 120 for activation of the selective, unidirectionally lockable devices 40, 42 is illustrated in FIG. 7. A lateral accelerometer 122 senses lateral accelerations acting on the sprung mass that in the illustrated embodiment includes tank 12 and box frame 14 of the embodiments shown in FIGS. 2-4 and 4A. The lateral accelerometer 122 is attached to box frame 14 and produces an output signal proportional to the magnitude and direction of the lateral acceleration acting on tank 12 and box frame 14. The signal is directed through a line 124 to an amplifier 126. The amplified signal is then directed through filter 128 into line 130 thence to logic controller 132 which is also mounted on box frame 14. Dependent upon the sign and magnitude of the amplified and filtered signal, the logic controller 132 commands the condition of the appropriate solenoid valves 74, 76 located at each selective, unidirectionally lockable device 40, 42. The output signal from the logic controller 132 is directed through either line 134 or 136 to either solenoid valve 76 or 74 locking said right selective, unidirectionally lockable device(s) 42 in either contraction while allowing free extension or extension while allowing free contraction respectively and through either line 138 or 140 to either solenoid valve 76 or 74 locking the left selective, unidirectionally lockable device(s) 40 in the opposite direction as compared to that locked out direction established for the right selective, unidirectionally lockable device(s) 42. The logic controller 132 further includes an output line 142 that is connected to a driver's warning device 144 that alerts the driver of the vehicle when said lateral acceleration is of a magnitude approaching the vehicle roll-over threshold.

Figure 8:
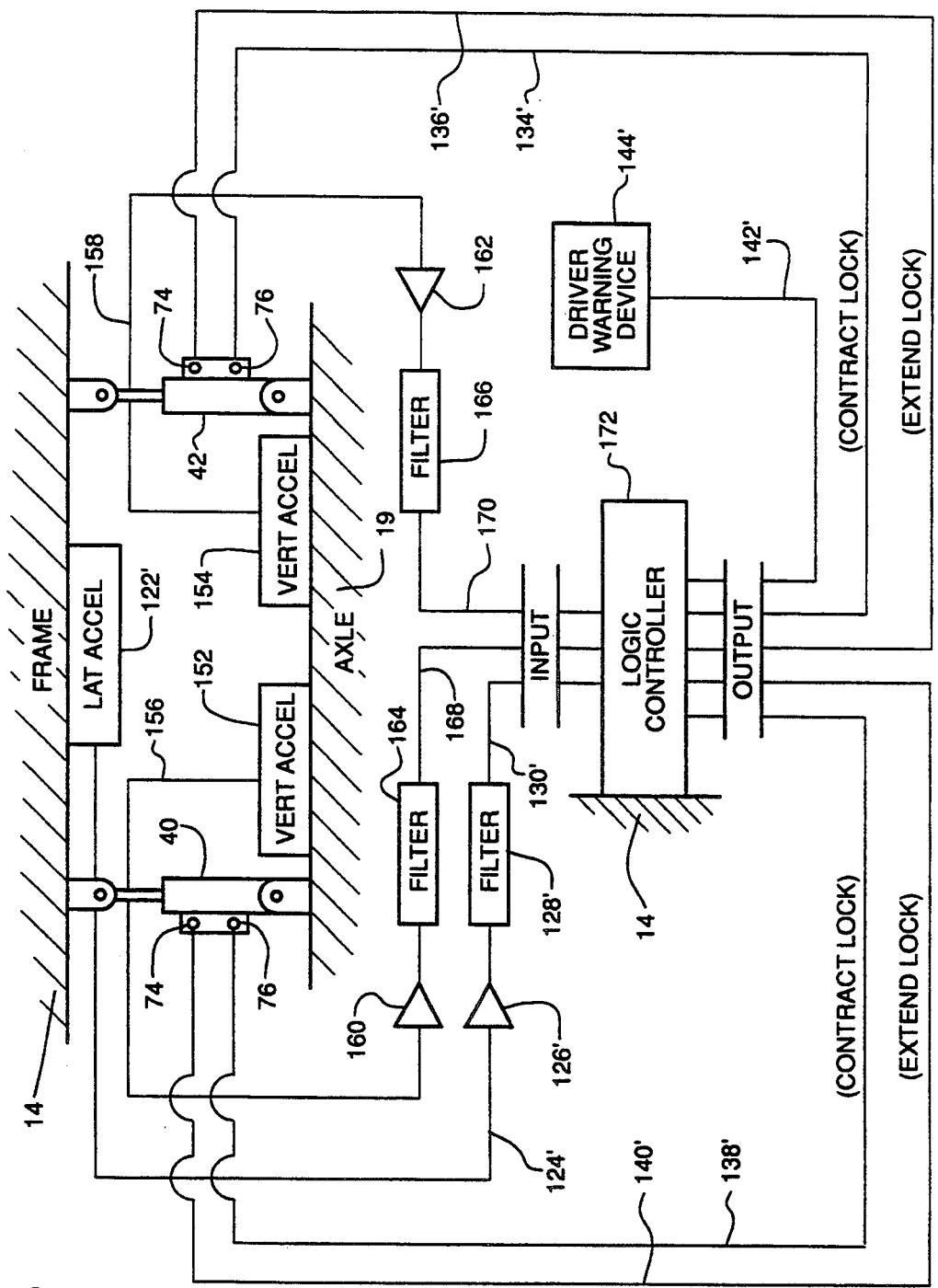
FIG. 8 is a schematic diagram showing the components of another embodiment of the anti-roll system of the present invention.

FIG. 8 illustrates an alternate control system 150 for activation of the selective, unidirectionally lockable devices 40, 42. In this embodiment the selective, unidirectionally lockable devices 40, 42 are controlled with respect to lateral acceleration in the same manner as in the embodiment depicted in FIG. 7 and like components are designated with like reference numerals primed with it being understood that corresponding components are connected and function in the same manner as those previously described in FIG. 7. This embodiment includes additional sensed vehicle operating parameters and corresponding control logic modifications to improve the vehicle ride quality as compared to the anti-roll system 148 depicted in FIG. 7. Accelerometers 152, 154 are mounted on axles 18, 19 near the respective tandem wheels 22, 24 of FIGS. 2-4 to measure the respective vertical accelerations at the individual tandem wheels 24, 24 resulting from road disturbances. The accelerometers 152, 154 output a signal proportional to the magnitude and direction of the vertical acceleration component which is directed through lines 156, 158 into amplifiers 160, 162. The amplified signals are then directed through filters 164, 166 into lines 168, 170 thence to logic controller 172 which is mounted to box frame 14. Within the logic controller 172, with the anti-roll system 174 operational (existence of a lateral acceleration above the preset threshold) and a sensed vertical acceleration at an individual tandem wheel 22, 24 location which is in the direction of lock-out and in excess of a preset threshold, the respective selective, unidirectionally lockable device 40, 42, is momentarily unlocked allowing the tandem wheel 22, 24 to react to the road disturbance. The selective, unidirectionally lockable device 40, 42 is again re-locked once the acceleration signal falls below the preset threshold. As in FIG. 7 the logic controller 172 further includes an output line 142 that is connected to a driver's warning device 144 that alerts the driver of the vehicle when said lateral acceleration is of a magnitude approaching the vehicle roll-over threshold.

The present invention has been illustrated and described with respect to preferred embodiments. However, it will be understood that the above described embodiments of the selective, unidirectionally lockable device and its control can be modified without departing from the scope of the attached claims. For example, while the above discussed control is utilized to selectively control the energization of a solenoid coil of a solenoid valve, it will be appreciated that the solenoid operated valve can be replaced with either a hydraulically or other fluid actuated valves. Likewise the above discussed locked out strut can be replaced by a rotary type shock absorber and the lock out can be provided by a mechanical lock that is selectively locked in one direction and free wheeling in the opposite direction between relatively moveable male and female members in either a vertically oriented strut device or in a horizontally disposed rotary type shock absorber.

What is claimed is:

1. An anti-roll system for wheeled vehicles having a sprung mass including frame members, body structure and payload and an unsprung mass including axles and roadwheels; said sprung and unsprung masses being interconnected through control arms, springs and dampers characterized by: inboard and outboard selective, unidirectionally lockable devices; each of said selective, unidirectionally lockable devices further including relatively movable male and female members connected between the sprung mass and the unsprung mass and operative to allow normally free floating motion; and means for locking the male and female members with respect to contraction, remaining free in extension or to lock the male and female members with respect to extension, remaining free in contraction; sensor means for measuring and signalling vehicle operational parameters indicative of the existence of a lateral acceleration acting on the sprung mass, and control means for interpreting the sensed parameters and commanding said outboard selective, unidirectionally lockable device to lock with respect to contraction, remaining free in extension and said inboard selective, unidirectionally lockable device to lock with respect to extension, remaining free in contraction; whereby said anti-roll system will provide increased roll stiffness and corresponding increased roll-over threshold.

2. The anti-roll system of claim 1 further characterized by said selective, unidirectionally lockable device including damper means for damping movements of said sprung mass in response to road disturbances when said selective, unidirectionally lockable device is operative to allow normally free floating motion whereby both the anti-roll lockup and road disturbance damping functions are combined into one device.

3. The anti-roll system of claim 1 further characterized by a driver's warning device operative to alert the driver of a vehicle when lateral acceleration approaches a level that will exceed the roll-over threshold of the vehicle.

4. The anti-roll system of claim 1, further characterized by a relief valve associated with each of said selective, unidirectionally lockable devices and operative when a road disturbance causes loads in said selective, unidirectionally lockable device that is locked with respect to contraction in excess of a preset threshold to cause said selective, unidirectionally lockable device that is locked with respect to contraction to momentarily contract in reaction to the disturbance, after which the selective, unidirectionally lockable device will be locked against further contraction.

5. The anti-roll system of claim 4 further characterized by means for sensing vertical accelerations of said roadwheel in both the rebound and jounce directions for producing a signal and means responsive to said signal above a preset threshold to unlock said selective, unidirectionally lockable devices that are locked in response to road disturbances whereby ride quality is dependent only upon said suspension system springs and dampers; said selective, unidirectionally lockable devices that are unlocked being relocked when said vertical acceleration of said roadwheel falls below said preset threshold.

6. The anti-roll system of claim 4 further characterized by said selective, unidirectionally lockable device including damper means for damping movements of said sprung mass in response to road disturbances when said selective, unidirectionally lockable device is operative to allow normally free floating motion whereby both the anti-roll lockup and road disturbance damping functions are combined into one device.

7. The anti-roll system of claim 4 further characterized by a driver's warning device operative to alert the driver of a vehicle when lateral acceleration approaches a level that will exceed the roll-over threshold of the vehicle.

8. The anti-roll system of claim 1, further characterized by means for sensing vertical accelerations of said roadwheel in both the rebound and jounce directions for producing a signal and means responsive to said signal above a preset threshold to unlock said selective, unidirectionally lockable devices that are locked in response to road disturbances whereby ride quality is dependent only upon said suspension system springs and dampers; said selective, unidirectionally lockable devices that are unlocked being relocked when said vertical acceleration of said roadwheel falls below said preset threshold.

9. The anti-roll system of claim 8 further characterized by said selective, unidirectionally lockable device including damper means for damping movements of said sprung mass in response to road disturbances when said selective, unidirectionally lockable device is operative to allow normally free floating motion whereby both the anti-roll lockup and road disturbance damping functions are combined into one device.

10. The anti-roll system of claim 8 further characterized by a driver's warning device operative to alert the driver of a vehicle when lateral acceleration approaches a level that will exceed the roll-over threshold of the vehicle.

* * * * *